United States Patent
Edwards et al.

(10) Patent No.: US 10,657,120 B2
(45) Date of Patent: May 19, 2020

(54) CROSS-PLATFORM DIGITAL DATA MOVEMENT CONTROL UTILITY AND METHOD OF USE THEREOF

(71) Applicant: Bank of America Corporation, Charlotte, NC (US)

(72) Inventors: Christopher Edwards, Weston, CT (US); Christopher John Finegan, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 561 days.

(21) Appl. No.: 15/283,846

(22) Filed: Oct. 3, 2016

(65) Prior Publication Data

US 2018/0096019 A1 Apr. 5, 2018

(51) Int. Cl.
*G06F 16/23* (2019.01)
*G06F 16/27* (2019.01)

(52) U.S. Cl.
CPC .......... *G06F 16/2365* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 2006/0047617 A1* | 3/2006 | Bacioiu | G06K 9/6262 706/59 |
| 2006/0123010 A1* | 6/2006 | Landry | G06F 16/25 |
| 2008/0275916 A1* | 11/2008 | Bohannon | G06Q 10/06 |
| 2011/0071979 A1* | 3/2011 | Tahiliani | G06F 7/00 707/600 |
| 2011/0313979 A1* | 12/2011 | Roberts | G06F 16/2365 707/690 |
| 2014/0164410 A1* | 6/2014 | Studer | G06F 16/2365 707/756 |
| 2015/0019303 A1* | 1/2015 | Rao | G06Q 10/06395 705/7.41 |
| 2016/0034502 A1* | 2/2016 | Dupey | G06F 16/215 707/688 |

(Continued)

*Primary Examiner* — Mark D Featherstone
*Assistant Examiner* — Navneet Gmahl
(74) *Attorney, Agent, or Firm* — Michael A. Springs

(57) ABSTRACT

A system includes an interface and one or more processors. The interface receives a dataset comprising a plurality of variable length input records, each input record comprising a plurality of fields. The one or more processors compare the input record to a plurality of predetermined record types to determine whether the input record matches one or more of the predetermined record types. Upon a determination that the input record matches one or more of the predetermined record types, the one or more processors determine one or more rules applicable to the input record. The one or more rules are determined based on the predetermined record types that match the input record. The one or more processors apply the one or more rules applicable the input record. The one or more rules determine the quality of the input record based on a structure of one or more of the fields of the input record and/or a value of one or more of the fields of the input record. The one or more processors determine a data quality of the dataset, the data quality determined based at least in part on the result of applying the one or more rules applicable to the input record.

17 Claims, 3 Drawing Sheets

(56) References Cited

U.S. PATENT DOCUMENTS

2016/0070733 A1* 3/2016 Gould .................. G06F 16/215
                                                     707/700
2016/0364434 A1* 12/2016 Spitz .................... G06F 16/215

* cited by examiner

CROSS-PLATFORM DIGITAL DATA MOVEMENT CONTROL UTILITY AND METHOD OF USE THEREOF

TECHNICAL FIELD

Certain embodiments of the present disclosure relate generally to digital data movement control. For example, certain embodiments of the present disclosure relate generally to controlling movement of digital data through a cross-platform network based on the data structure of the digital data.

BACKGROUND

Servers and databases store information in the form of digital data. In some instances, the digital data may be processed and/or communicated between computers. In a cross-platform network, the digital data may be processed and/or communicated among many different types of computers running many different software programs. As cross-platform networks have become more complex, systems for controlling movement of digital data have proved inadequate in various respects. Accordingly, there is a need for a cross-platform digital data movement utility for overcoming the limitations of these systems.

SUMMARY

According to an embodiment, a system includes an interface and one or more processors. The interface receives a dataset comprising a plurality of variable length input records, each input record comprising a plurality of fields. The one or more processors compare the input record to a plurality of predetermined record types to determine whether the input record matches one or more of the predetermined record types. Upon a determination that the input record matches one or more of the predetermined record types, the one or more processors determine one or more rules applicable to the input record. The one or more rules are determined based on the predetermined record types that match the input record. The one or more processors apply the one or more rules applicable to the input record. The one or more rules determine the quality of the input record based on a structure of one or more of the fields of the input record and/or a value of one or more of the fields of the input record. The one or more processors determine a data quality of the dataset, the data quality determined based at least in part on the result of applying the one or more rules applicable to the input record.

According to another embodiment, a non-transitory computer readable medium comprises logic that, when executed by a processor, is operable to receive a dataset comprising a plurality of variable length input records, each input record comprising a plurality of fields. The non-transitory computer readable medium is further operable to, for each input record, compare the input record to a plurality of predetermined record types to determine whether the input record matches one or more of the predetermined record types. The non-transitory computer readable medium is further operable to, for each input record, upon a determination that the input record matches one or more of the predetermined record types, determine one or more rules applicable to the input record, the one or more rules determined based on the predetermined record types that match the input record. The non-transitory computer readable medium is further operable to, for each input record, apply the one or more rules applicable to the input record, wherein the one or more rules determine quality of the input record based on a structure of one or more of the fields of the input record and/or a value of one or more of the fields of the input record. The non-transitory computer readable medium is further operable to determine a data quality of the dataset, the data quality determined based at least in part on the result of applying the one or more rules applicable to the input record.

According to yet another embodiment, a method includes receiving a dataset comprising a plurality of variable length input records, each input record comprising a plurality of fields. The method further includes, for each input record, comparing the input record to a plurality of predetermined record types to determine whether the input record matches one or more of the predetermined record types. The method further includes, for each input record, upon a determination that the input record matches one or more of the predetermined record types, determining one or more rules applicable to the input record, the one or more rules determined based on the predetermined record types that match the input record. The method further includes, for each input record, applying the one or more rules applicable to the input record, wherein the one or more rules determine quality of the input record based on a structure of one or more of the fields of the input record and/or a value of one or more of the fields of the input record. The method further includes determining a data quality of the dataset, the data quality determined based at least in part on the result of applying the one or more rules applicable to the input record.

Certain embodiments provide one or more technical advantages. For example, an embodiment improves processing speed by ensuring that data is system agnostic. As another example, an embodiment reduces processing and memory usage by reducing data errors. For example, an embodiment reduces data errors by ensuring data completeness. Some embodiments may reduce data errors by determining whether data is in a correct format. In these embodiments, metadata may be used to facilitate determining that one or data entries require particular formatting. The data entries may be parsed to ensure that the data entries are in the required format. This reduces errors caused by packet loss, keying errors, memory leaks, etc.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
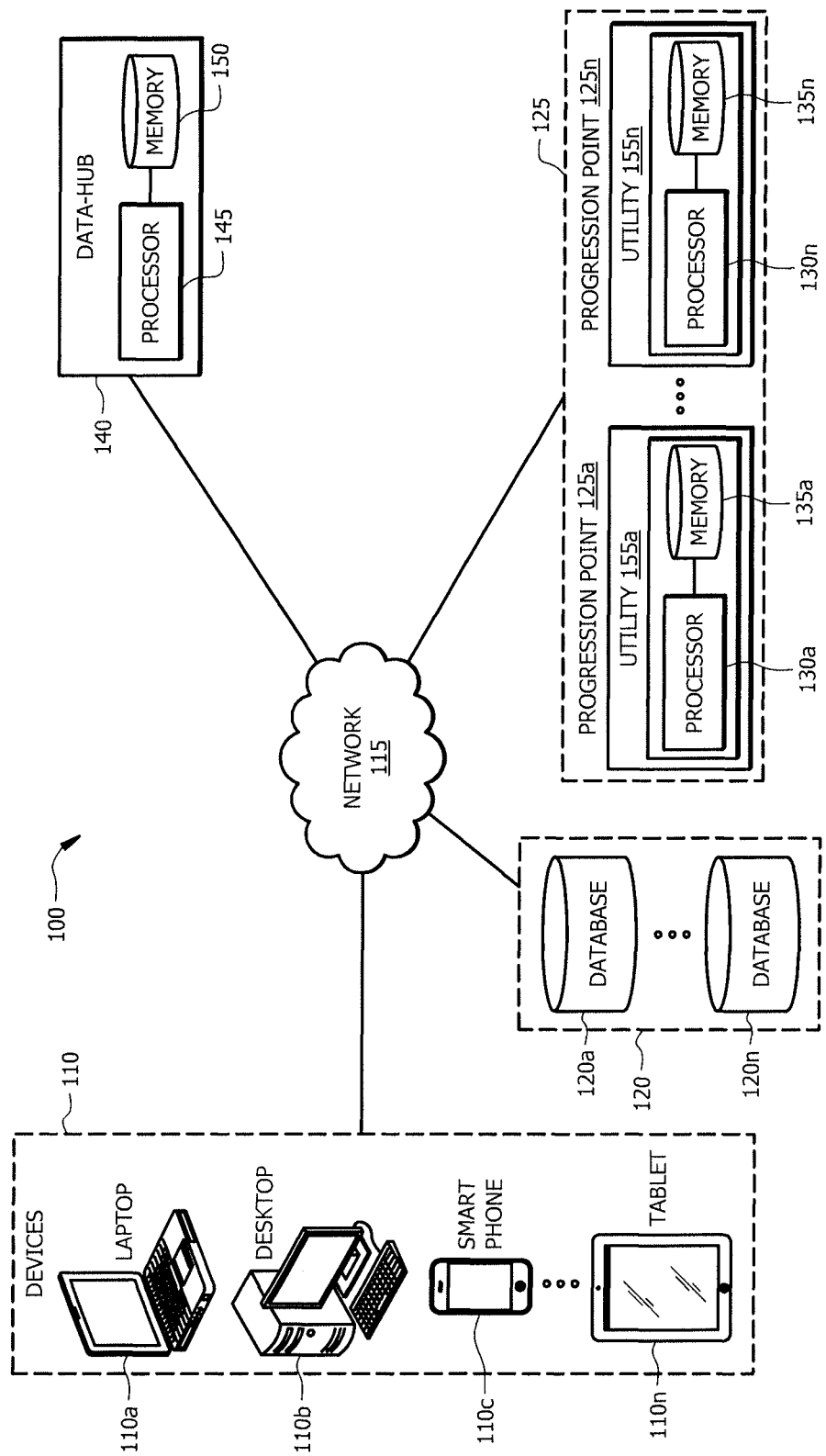
FIG. 1 illustrates an example of a system for data quality assurance.
Figure 2:
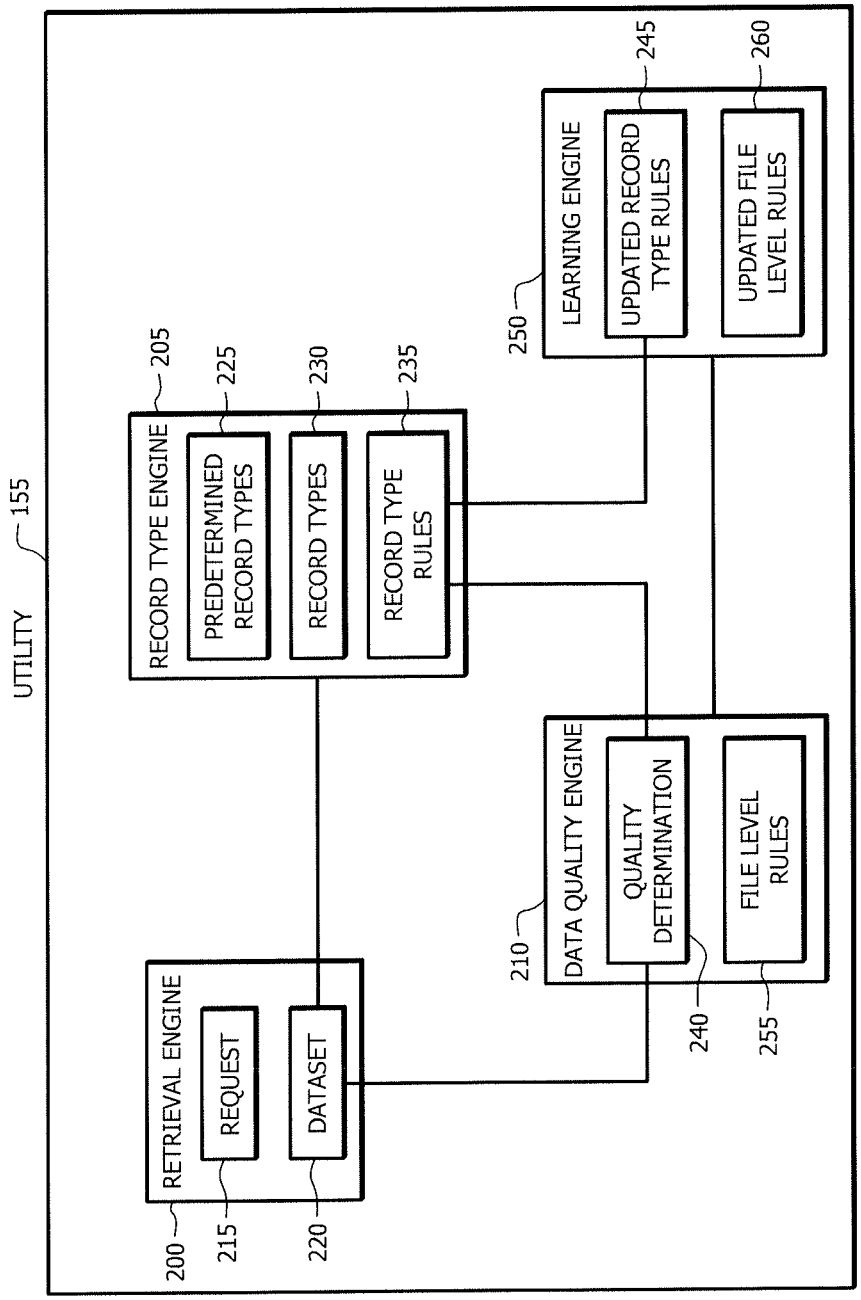
FIG. 2 further illustrates the data quality assurance utility of FIG. 1.
Figure 3:
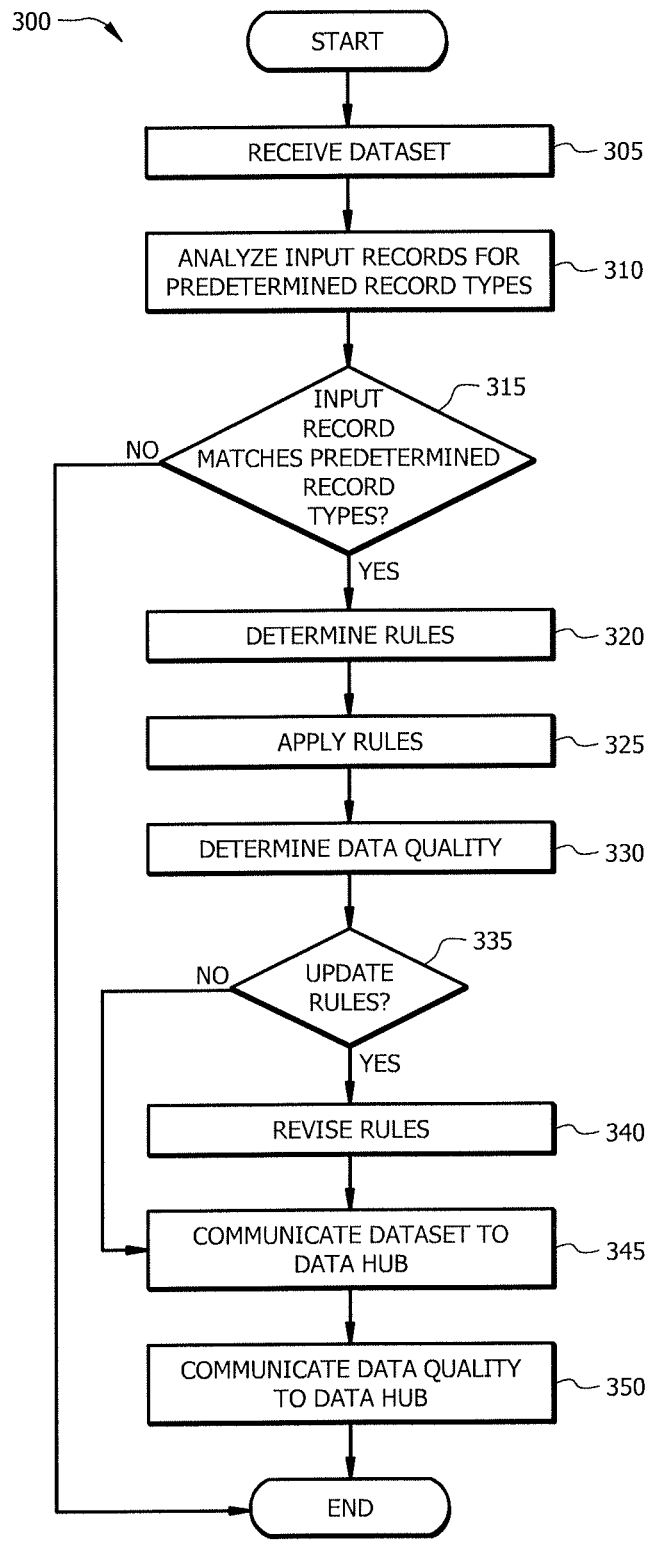
FIG. 3 illustrates an example flow chart for a method for assessing data quality.

Embodiments of the present disclosure and its advantages are best understood by referring to FIGS. 1 through 3 of the drawings, like numerals being used for like and corresponding parts of the various drawings.

Cross-platform digital data movement presents certain technical problems and challenges. Files comprising digital datasets with data entries may comprise errors, causing the dataset to fall below an acceptable quality. For example, data could comprise keystroke errors. As another example, an enterprise may experience data loss (e.g., in data communication), resulting in an incomplete dataset. An enterprise may also experience packet loss during the communication of a dataset. Data errors in a dataset may render processing the dataset impossible. For example, a machine executing a data processing algorithm may expect to receive data in a certain format. If the data is not in the expected format, the machine may be unable to process the dataset. The dataset may be processed a plurality of times as it is moved across an enterprise's system. If the dataset quality falls below an acceptable level, the data processing and movements may be unusable. For example, data errors may require rectification before the dataset is reprocessed and the file is resent across an system. Reprocessing and resending data due to data errors may cause an increase of the processing and/or memory usage of the machines processing and communicating the dataset.

This disclosure contemplates a cross-platform digital data movement control process and metric measurement collection utility that performs flexible and customized data validation and determines the quality of a dataset. The utility determines the validity of one or more data entries. A data consumer may specify requirements for one or more data entries in a dataset. For example, a consumer may specify that one or more data entries require a particular format. For example, a data entry may require a particular date format, a particular time format, a particular timestamp format, or any other particular format. As another example, a data entry may require a certain range. For example, a data entry in a numerical format may be required to be within a range of 0-100 or any other suitable numerical range. The utility may determine the validity of data entries and produce data quality statistical measurements. A dataset may be processed and flow through a plurality of progression points throughout an enterprise's systems. At each progression point, the utility may perform a data quality analysis. This allows the contemplated system to detect data quality anomalies and facilitates determining the cause of the anomalies. These anomalies may be detected at the progression point that caused the data quality anomaly, reducing the unneeded memory, processor, and bandwidth consumption required to identify the source of an anomaly and/or to process and communicate unusable data to downstream progression points. This disclosure contemplates eliminating or reducing erroneous data processing results and communication. FIG. 1 will describe the utility generally. FIGS. 2 and 3 will describe the utility in more detail.

FIG. 1 illustrates a system 100 for data quality management. As illustrated in FIG. 1, system 100 includes one more devices 110, a network 115, databases 120a-n, and progression points 125a-n. In particular embodiments, system 100 maintains data integrity by identifying data errors at a relatively early stage, thus reducing or eliminating unnecessary computer resource usage.

Devices 110 may be any devices that operate and/or communicate with other components of system 100. In general, devices 110 request and/or receive processed data. For example, devices 110 communicate a request to receive data to data hub 140, one or more progression points 125, or any other suitable component of system 100. Devices 110 may be associated with an enterprise or a business unit within an enterprise. Devices 110 and/or their associated enterprises may consume data. For example, the data may be used to provide to decision-making systems and/or to comply with regulatory reporting.

This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

System 100 comprises databases 120a-n, where n represents any suitable number. For example, system 100 may comprise a single database 120 or any number of databases 120. Generally, databases 120 store digital data files. The digital data files may comprises one or more digital datasets. Each dataset may comprise one or more data entries. For example, databases 120 may store consumer retail account data for a financial services company. This disclosure does not limit the databases 120 to storing only consumer retail account data. This disclosure contemplates databases 120 storing any suitable data type. Databases 120 may be location within a progression point 125, outside of a progression point 125, or any other suitable location in system 100.

In the illustrated embodiment, system 100 comprises progression points 125a-n, where n represents any suitable number. Generally, progression points 125 receive, store, and/or communicate data. In some embodiments, progression point 125 is a system of record. In some embodiments, progression points 125 process received data and communicate the data to another progression point and/or centralized data hub 140. In an embodiment, progression point 125 may receive data (e.g., from database 120) associated with one or more Automatic Teller Machines ("ATMs"). For example, a progression point 125 may receive data from a subset of ATMs, such as ATMs located in a particular geographic area. Progression point 125 may process this data and communicate the data to a different progression point 125 that receives ATM data from a plurality of geographic areas from a plurality of progression points 125. This progression point 125 may process the data before communicating data to data hub 140. As illustrated in FIG. 1, utility 155 includes a processor 130 and memory 135. This disclosure contemplates processor 130 and memory 135 being configured to perform any of the operations of utility 155 described herein. In particular embodiments, utility identifies data anomalies.

In the illustrated embodiment, each progression point 125 comprises a utility 155. Utility 155 generally determines data quality of received data. In some embodiments, utility 155 comprises processor 130 and memory 135. Processor 130 is any electronic circuitry, including, but not limited to microprocessors, application specific integrated circuits (ASIC), application specific instruction set processor (ASIP), and/or state machines, that communicatively couples to memory 135 and controls the operation of utility 155. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory 135 and executes them by directing the coordinated operations of the ALU, registers and other components. Processor 130 may include other hardware and software that operates to control and process information. Processor 130 executes software stored on memory 135 to perform any of the functions described herein. Processor 130 controls the operation and administration of utility 155 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein. In particular embodiments, memory 135 may store received data, such as data received from database 120. Memory 135 may further comprise logic, the logic comprising rules to determine data quality of received data. This disclosure contemplates memory 135 storing any of the elements stored in databases 120 and/or utility 155.

Data hub 140 generally receives data and determines data quality anomalies. For example, data hub 140 may receive processed data from one or more progression points 125. Data hub 140 may be a centralized data hub that stores data for consumption. For example, data consumers may subscribe to data. The data may be communicated to data hub 140 before it is communicated to data consumers.

In an embodiment, data hub 140 determines data anomalies. Utility 155 determines data quality and may communicate the data quality to data hub 140. A dataset may flow throw a plurality of progression points 125, and each progression point may communicate a data quality associated with the dataset to data hub 140. Data hub 140 may determine data quality anomalies by comparing data quality results from two or more progression points 125. As an example, suppose a dataset flows through progression points 125*a* and 125*b*. If the data quality of the dataset is within a pre-determined tolerance at first progression point 125*a*, but outside the pre-determined tolerance at a second progression point 125*b*, data hub 140 may determine that the second progression point 125*b* is responsible for the low data quality. In this embodiment, data hub 140 can send a request to reprocess to rectify the low data quality. For example, data hub 140 may request to the progression point 125 responsible for low data quality to reprocess the dataset. Determining dataset quality anomalies at an early stage allows correction of data errors before the data is communicated to another progression point. If the data quality anomaly is not detected, the dataset with poor data quality may be processed additional times. This processing may be unusable, and progression points 125 may need to reprocess the data errors are corrected. This additional processing may consume unneeded memory and/or processing resources of a progression point.

Data hub 140 may further detect an unacceptable data quality. For example, as data may be communicated to a first progression point 125 for processing. The first progression point may process at dataset, and utility 155 may determine the data quality before it is send to data hub 140. If the data quality falls below an acceptable level, data hub 140 may send a request to progression point 125 to reprocess the dataset. As another example, data hub 140 may prevent the data from being communicated to a second progression point 125 for further processing until errors in the data are corrected. This provides the advantage of reducing or eliminating unneeded data processing, thus reducing the computer resource consumption of data processing systems.

Data hub 140 includes processor 145 and memory 150. Processor 145 is any electronic circuitry, including, but not limited to microprocessors, ASIC, ASIP, and/or state machines, that communicatively couples to memory 150 and controls the operation of data hub 140. Processor 145 may be 8-bit, 16-bit, 32-bit, 64-bit or of any other suitable architecture. Processor 145 may include an ALU for performing arithmetic and logic operations, processor registers that supply operands to the ALU and store the results of ALU operations, and a control unit that fetches instructions from memory 150 and executes them by directing the coordinated operations of the ALU, registers and other components. Processor 145 may include other hardware and software that operates to control and process information. Processor 145 executes software stored on memory 150 to perform any of the functions described herein. Processor 145 controls the operation and administration of data hub 140 by processing information received from network 115, device(s) 110, and memory 150. Processor 145 may be a programmable logic device, a microcontroller, a microprocessor, any suitable processing device, or any suitable combination of the preceding. Processor 145 is not limited to a single processing device and may encompass multiple processing devices.

Memory 150 may store, either permanently or temporarily, data, operational software, or other information for processor 145. Memory 150 may include any one or a combination of volatile or non-volatile local or remote devices suitable for storing information. For example, memory 150 may include RAM, ROM, magnetic storage devices, optical storage devices, or any other suitable information storage device or a combination of these devices. The software represents any suitable set of instructions, logic, or code embodied in a computer-readable storage medium. For example, the software may be embodied in memory 150, a disk, a CD, or a flash drive. In particular embodiments, the software may include an application executable by processor 145 to perform one or more of the functions described herein. In particular embodiments, memory 150 may store received data, such as data received from database 120 and/or progression points 125. Memory 150 may further comprise logic, the logic comprising rules to determine data quality of received data. This disclosure contemplates memory 150 storing any of the elements stored in databases 120 and/or utility 155.

Modifications, additions, or omissions may be made to system 100 without departing from the scope of the invention. For example, system 100 may include any number of processors 130, memory 135, devices 110, and/or databases 120. Furthermore, the components of system 100 may be integrated or separated. For example, in particular implementations, memory 135 may be separated into multiple memories 135 to store the data described herein.

FIG. 2 illustrates a utility 155 of the system 100 of FIG. 1. As illustrated in FIG. 2, utility 155 includes retrieval engine 200, record type engine 205, data quality engine 210, and learning engine 250. In particular embodiments, utility 155 reduces processing and memory demand in a data communication and storage environment by insuring the integrity of the data.

In certain embodiments, retrieval engine 200 receives dataset 220. Retrieval engine 200 may be capable of receiving dataset 220 according to a pull mode and/or a push mode, depending on the embodiment. In an embodiment of the pull mode, retrieval engine 200 may receive a request 215 (e.g., from one or more devices 110) and, in response, may initiate retrieving dataset 220 (e.g., from database 120). In an embodiment of the push mode, retrieval engine 200 may receive dataset 220 as the data flows through a progression point 125 (e.g., the progression point 125 executing the utility 155 that includes retrieval engine 200). Thus, in certain embodiments, it is possible for retrieval engine 200 to receive dataset 220 independently of a request 215.

In particular embodiments, retrieval engine 200 initiates processing dataset 220 and/or communicating dataset 220 to one or more progression points 125, data hub 140, and/or any other suitable component of system 100. As examples, retrieval engine 200 may receive dataset 220, initiate processing of dataset 220, and/or initiate communicating dataset 220 in response to a request 215 (e.g., from one or more devices 110), according to pre-determined rules (e.g., independently of request 215), as the result of the occurrence of a pre-determined event or condition, etc. Dataset 220 generally comprises a plurality of variable length input records. Each input record generally comprises a plurality of fields. Dataset 220 may be stored in, e.g., database 120. Dataset 220 may be utilized for any suitable type of programming language. An example algorithm for retrieval engine 200 is as follows: wait for request 215; receive request 215 from one or more devices 110; in response to receiving request 215, retrieve dataset 220 from database 120; receive dataset 220; send request 215 and dataset 220 to record type engine 205.

In some embodiments, request 215 (e.g., from one or more devices 110) includes information that facilitates determining record types rules 235 and/or file level rules 255. Thus, retrieval engine 200 may forward request 215 to record type engine 205 so that record type engine 205 can determine the applicable record type rules and/or file level rules 255. In other embodiments, record type engine 205 may be operable to determine record type rules 235 and/or file level rules 255 independently of receiving a request 215. As an example, in response to receiving a dataset 220, record type engine 205 may be configured to automatically determine record type rules 235 and/or file level rules 255 to apply to dataset 220 based on the record types contained within dataset 220.

Record type engine 205 generally extracts record types from dataset 220 and determines record type rules 235 to apply to dataset 220. For example, one or more input records in dataset 200 may be associated with one or more record types 230. Record type engine 205 may determine one or more record types 230 associated with one or more data entries in dataset 220. Record type 230 generally indicates a record layout structure of a plurality of fields. For example, record type 230 may be a header record type, a detail record type, and/or a trailer record type. Detail record types may indicate that a record comprises a date data entry, a time data entry, a numerical data entry, or any other suitable type of data entry. Record type engine 205 may compare the determined record types 230 to predetermined record types 225 to determine whether there is a "hit." For example, record type engine 205 may determine whether one or more record types 230 match a record type indicated by predetermined record types 205. Predetermined record types are generally record types specified by, e.g., a user and stored in utility 155. For example, one or more devices 110 may communicate predetermined record types 225 to utility 155. An example algorithm for record type 205 to determine record type hits is as follows: receive dataset 220 from retrieval engine 200; analyze dataset 200 to determine one or more record types 230; compare record types 230 to predetermined record types 225 to determine record type hits. In some embodiments, dataset 220 may comprise variable length input records. In this embodiments, record type engine 205 determines where each record begins and ends. Record type engine 205 may then determine record types 230 as discussed.

If record type engine 205 determines one or more record type hits, record type engine 205 may determine record type rules 235 associated with the one or more record types 230 of dataset 220. In some embodiments, record types rules 235 are customizable rules to ensure data quality. For example, record type rules may be applied to one or more data entries in dataset 220 to determine whether a data entry is complete and/or in a suitable format.

Record type rules 235 may comprise a numerical value check. For example, one or more data entries may be expected to include a numerical value. A record type rule 235 may determine whether one or more fields within an input record comprise a numerical value.

Record type rules 235 may comprise a null value check. For example, a record type rule 235 may indicate that data entries associated with the rule should not be a null value. The record type rule 235 may determine whether one or more fields within an input record comprise a null value.

Record type rules 235 may comprise a valid date check. For example, a record type rule 235 may determine whether one or more fields within an input record comprise a date entry. The record type rule 235 may further indicate the expected format for a date entry (e.g., YY/M/D, M/D/YYYY, M-D-YY, MDYY, etc.).

Record type rules 235 may comprise a valid time check. For example, a record type rule 235 may determine whether one or more fields within an input record comprise a time entry. The record type rule 235 may further indicate the expected format for a time entry (e.g., HHMMSS, HH:MM:SS, HH:MM, etc). Time requirement may further indicate that time entries are expected to be entered in 24-hour format, a 12-hour format, or any other suitable format.

Record type rules 235 may comprise a range check. For example, a record type rule 235 may determine whether a one or more fields within an input record fall within a predetermined numerical range.

Record type rules 235 may comprise a sum value operation. For example, a record type rule 235 may indicate that two or more fields should be summed. Any record type rule 235 or any other suitable record type rule 235 may be applied to the summed fields.

Record type rules 235 may be customizable. For example, a data consumer may utilize device 110 to specify record type rules 235. For example, a user may use a cafeteria style interface to specify record type rules 235. In this example, a user may be presented with a plurality of record type rules 235 and select a subset of those rules to apply to dataset 220. The user may select the particular record type rules 235 to apply to dataset 220. The user may customize the selected record type rules 235. For example, the use may customize a required data format, a range, and/or a time format associated with the respective record type rules 235.

Record type engine 205 communicates predetermined record types 225, record types 230, and/or record type rules 235 to data quality engine 210. An example algorithm for record type engine 205 to determine record type rules 235 is as follows: determine whether one or more record type rules 235 is associated with the record type hits; determine the record type rules 235 associated with the record type hits; communicate dataset 220, and/or record type rules 235 to data quality engine 210. Record type engine 205 may further communicate predetermined record types 205, record types 230, and/or record type hits to data quality engine 210.

Data quality engine 210 generally applies rules to dataset 220 to generate a statistical data quality analysis. For example, data quality engine may apply one or more record type rules 235 to one or more entries in dataset 220. Data quality engine 210 may apply file level rules 255 to a dataset 220. File level rules 255 may include record count rules to determine whether dataset 220 comprises a suitable number of data entries. File level rules 255 may include byte count rules to determine whether dataset 220 comprises a suitable number of bytes. File level rules 255 may include duplicate row rules to determine whether dataset 200 comprises duplicate rows of data entries. File level rules 255 may include duplicate key rules which may determine whether there are duplicate data entries in dataset 220. File level rules 255 may be customized using a cafeteria style interface as discussed in relation to record type rules 235. Data quality engine 210 may generate quality determination 240 by applying record type rules 235 and/or file level rules 255 to dataset 220. For example, if dataset 220 and/or one or more data entries within dataset 220 does not comply with a record type rule 235 and/or a file level rules 255, data quality engine 210 may determine that there is an error in dataset 220. Data quality engine 210 may generate quality determination 240 by applying record types rules 235 and/or file level rules 255 to dataset 220. For example, quality determination 240 may indicate the number of errors in dataset 220. As another example, quality determination may determine the percent percentage of data entries that comprise an error. In some embodiments, quality determination 240 is communicated to data hub 140. As discussed, data hub 140 may determine a data quality anomaly using two or more quality determinations from two or more progressing points 125. Data quality engine 210 may further communicate dataset 220 to data hub 140 and/or other progression points 125. In an embodiment, data quality engine communicates dataset 220 and quality determination 240 together in a zipped file. In some embodiments, data quality engine 210 may communicate a return code to data hub 114 upon a determination that quality determination 240 falls below a predetermined quality. In this example, the return code alerts data hub of the poor data quality. In certain embodiments, the return code may be standardized such that the return code has a consistent meaning among devices 110, progression points 125, and data hub 140. An example algorithm for data quality engine 210 to generate quality determination 240 is as follows: wait to receive dataset 220; receive dataset 220 and record type rules 235; apply record type rules 235 and file level rules 255 to dataset 220 to generate quality determination 240; export quality determination 240 and dataset 220.

In some embodiments, utility 155 may comprise learning engine 250. Generally, learning engine 250 updates record type rules 230 and/or file level rules 255. Generally record type rules 230 and/or file level rules 255 determine characteristics of dataset 220 and/or its associated data entries. For example, file level rules may determine the size of dataset 220, the number of data rows of dataset 220, etc. As another example, record type rules 245 may determine the upper and lower numerical data entries of dataset 220, the number of date format data entries in dataset 220, etc. Learning engine 250 may leverage this information to revise record type rules 230 and/or file level rules 255. Learning engine 225 may create updated record type rules 245 and/or updated file level rules 260 to indicate that certain attributes of dataset 220 be within a margin of error of a previously received dataset 220. In some embodiments, updated record type rules 245 and/or updated file level rules 260 determine whether the value of one or more of the fields of the input record falls within a predetermined tolerance. The predetermined tolerance may be determined based on applying rules to one or more previous datasets 220 before applying the at least one rule to the current dataset 220. For example, if a dataset comprises a certain number of bytes, learning engine 250 may create an updated file level rule to indicate that the next dataset 220 should comprise a greater number of bytes. As another example, if data quality engine 210 determines a numerical range associated with dataset 220, learning engine 250 may create an updated record type rule 245 to indicate that the next dataset 220 should have a range within a certain percent of the determined range (e.g., five percent). The updated record type rules 245 are communicated to record type engine 205 and stored as record type rules 235. The updated file level rules 260 are communicated to data quality engine 210 and stored as file level rules 255. An example algorithm for learning engine 250 to generate updated record type rules 24 and updated file level rules 260 is as follows: receive dataset 220 characteristics from data quality engine 210; use dataset 220 characteristics to generate updated record type rules 245 and/or updated file level rules 260; communicate updated record type rules 240 to record type engine 205; communicate updated file level rules 260 to data quality engine 210.

Modifications, additions, or omissions may be made to utility without departing from the scope of the invention. For example, utility 155 may include any number of processors 130 and/or memories 135. As a further example, utility 155 may not include learning engine 250. As yet another example, data quality engine 210 may generate quality determination 240 for a plurality of datasets 220. For example, data quality engine 210 may receive a plurality of datasets 220 and generate a single quality determination 240 for the datasets 220. As another example, utility 155 may not include file level rules 255. As yet another example, utility 155 may not include record type rules 235.

FIG. 3 is an example flow chart for a method for assessing data quality. In particular embodiments, utility 155 performs method 300. By performing method 300, utility 155 may ensure the quality of the data, which may reduce processing and memory demand in a data communication and storage environment.

Utility 155 begins by receiving dataset 220 at step 305. In some embodiments, one or more input records in dataset 220 are input to utility 155. In certain embodiments, the input records may comprise one or more physical records that are read into utility 155. Utility determines input record types in step 310. For example, utility 155 may determine one or more record types associated with dataset 220. In step 315, utility 155 determines whether there are any predetermined record types 225. For example, utility 155 determines whether one or more record types 230 matches one or more predetermined record types 225. In some embodiments, each record type 230 determined in step 310 is compared to match zero, one, or more predetermined record types 225. If there are not record type hits in step 315, the method ends. If there are record type hits in step 315, the method proceeds to step 320 where utility determines rules associated with the predetermined record types 225. For example, utility may determine record type rules 235 and/or file level rules 255.

The method then proceeds to step 325 where utility 155 applies the rules. In some embodiments, each record type rule 235 is applied against the input record. As discussed, each record type hit may correspond to one or more record type rules 235. In some embodiments, record type rules 235 comprise field level-rules. In some embodiments, more than one field-level rule may apply to a field. For example, a calendar date field may comprise a null value check and a valid date check. Utility 155 may also apply file level rules 255 at step 325. As discussed, file level rules 255 may determine a row/record count, a byte count, a duplicate file check, a duplicate row check, and/or a duplicate key check. Errors identified by file level rules 235 may be aggregated and summed across dataset 220.

The application of the rules is used to generate quality determination 240 at step 330. For example, the number of data errors in dataset 220 may be counted and aggregated across each record type hit as dataset 220 is read from beginning to end. The aggregated errors may be used to create an exception, For example, if more than 1000 "invalid calendar date values" are encountered, a threshold/trend limit or range check might be defined to "count" that as an exception condition and keep a separate counter of how many times that exception might occur. As another example, if "row-count" is less than 100 records, then that might be "counted" as an exception condition. Quality determination 240 may indicate that the dataset 220 falls below a predetermined quality if dataset 220 comprises one or more exceptions. At step 335, utility 155 determines whether to generate updated record type rules 245 and/or updated file level rules 260. If utility 155 does not update the rules, the method proceeds to step 345. If utility 155 determines to update the rules in step 335, the method proceeds to step 340 where utility 155 generates updated record type rules 245 and/or updated file level rules 260. The method proceeds to step 345 where utility 155 communicates dataset 200 to data hub 140. Utility 155 communicates quality determination 240 to data hub 140 at step 350 before the method ends.

Modifications, additions, or omissions may be made to method 300 depicted in FIG. 3. Method 300 may include more, fewer, or other steps. For example, steps may be performed in parallel or in any suitable order. Method 300 may not perform steps 335 and 340. Utility 155 may communicate dataset 220 and or quality determination to a progression point 125 and/or any other suitable component of system 100. In yet another example, a progression point 125 may alter dataset 220 before it is communicated to data hub 140.

Certain embodiments of the present disclosure may provide solutions to traditional approaches for evaluating the quality of data. As an example, most organizations take a monolithic approach to evaluating the quality of data that moves through the organization. In a monolithic approach, one centralized processor runs one giant program that has been customized to a mainframe format used by the centralized processor. The program evaluates the quality of the data across the organization. The monolithic approach is costly, complex, and slow. For example, it takes time to ship the large sets of data to the centralized processor. The centralized processor takes a long time to process the data due to the volume of data/computational load on the centralized processor. Additionally, errors may be propagated and compounded as the data flows across the organization to the centralized processor. As a result, a significant amount of processing resources may be required to detect the source of the error in order to correct the error.

Certain embodiments of the present disclosure may provide one or more technical advantages over the monolithic approach used by most organizations. For example, embodiments of the present disclosure provide a distributed approach for evaluating the quality of data. In the distributed approach, progression points 125 throughout the network evaluate the quality of data as the data flows through the network, This may allow for faster processing times (e.g., smaller datasets are handled by more processors) and the ability to more easily determine the source of an error (e.g., if the data quality is within a pre-determined tolerance at a first progression point 125*a*, but outside the pre-determined tolerance at a second progression point 125*b*, it may be determined that progression point 125*b* is at or near the source of the error).

In certain embodiments, using a distributed approach for evaluating the quality of data may allow progression point 125 and/or data hub 140 to ensure data is fit for use by downstream systems, such as one or more devices 110, before sending the data downstream. Whether the data is fit for use may depend on (and may be tailored to) the tolerance of the downstream system in the event that certain downstream systems have a higher tolerance for errors than other downstream systems. In certain embodiments, each progression point 125 may output data quality statistics and/or information (e.g., return codes) according to a standardized format used by other progression points 125, data hub 140, and/or downstream devices 110, for example, so that a determination whether the data quality is within the tolerance of the downstream system may be made more easily.

In order to provide consistent data quality assessment in a distributed fashion, utility 155 may be configured to run on a variety of progression points 125, independently of the various underlying programming languages of the progression points 125 and the various dataset formats used by the different progression points 125. In other words, utility 155 may be flexible and capable of processing a variety of dataset formats so that it may be run on any a variety of progression points 125. For example, in certain embodiments, utility 155 may be operable to process not only fixed-length records, but also variable-length records as input. In certain embodiments, utility 155 may be operable to process not just single record-type required per record, as "one and only one" qualifying, but zero, one, or more record-type rule declarations qualifying per physical record read. That is, utility 155 may compare an input record to a plurality of predetermined record types to determine whether the input record matches one or more of the predetermined record types and may determine one or more rules to apply based on the predetermined record types that match the input record, as discussed above with respect to FIG. 3. Matching the input record to record types may allow utility 155 to process a variety of input records without having to know in advance the format of the input record, such as which fields are contained in the record, the length of the fields, the order of the fields, whether the fields are continuous or non-continuous, whether the record includes a header or trailer, etc.

As another example, utility 155 may be operable to process not just one record-type specification line, but also parenthesis to permit multiple fields or ranges or value-lists to identify which field-level rule-sets and record-layout-structure-sets to apply to physical record read, and may permit longer values should longer key-values be encountered. As another example, utility 155 may be operable to process not just file and field-level rule-sets, but also "record-type" level rule-sets. As another example, utility 155 may be operable to process not just one range per field or file, but also multiple ranges, allowing for parentheses, each with optional "return-code," and expanded range/limit control value size permitted. As another example, utility 155 may be operable to process not just contiguous primary-key fields in input file, but also multiple non-contiguous fields allowable to be defined to look for duplicate "primary-key" value-sets on input file. Similarly, multiple non-contiguous fields can be used to match an input record to a record type. As another example, utility 155 may be operable to support expanded range specifications that allow parentheses as well as more "end-of-file" rule-type range evaluations. As another example, utility 155 may be operable to provide lookup-capability to a reference data set. The reference data may be used when applying rules to evaluate data quality. In one embodiment, a rule may indicate that a particular record type should be within the limits set by the reference data set or within a pre-determined range of the limits set by the reference data set, such as plus-or-minus five percent.

In certain embodiments, utility 155 may be configured using a cafeteria style interface to enable or disable certain functionality, such as which record types to match or which rules to include or exclude from a subset of rules to be applied. For example, utility 155 may be configured by a system administrator to enable or disable functionality depending on the needs of the organization. In addition, or in the alternative, utility 155 may be capable of automatically enabling or disabling certain functionality depending on the constraints of the progression point 125 on which it is executing. Thus, a first progression point 125 with higher availability (e.g., higher processor availability, higher RAM availability, and/or higher tolerance for processing delays) may have more numerous and/or more complex features enabled than a second progression point 125 with less availability. In certain embodiments, a control file may be used to configure which of the rules available to utility 155 should be included or excluded in a subset of rules to be applied by a progression point 125. The control file may be configured based on the constraints of the progression point 125.

As another example, utility 155 may be used together with external synchronization and procedural protocols ("external sync") to facilitate comparison of data in dataset 220 or a file being examined to an expected date of data in a cycle being processed. As another example, utility 155 is used in a standard framework to capture any abnormal "rerun" conditions using external sync. In yet another embodiment, the cross-platform successful transmission is communicated by utilizing external-sync to both capture rerun occurrences as well as being used for acknowledgements of satisfactory receipt. In another embodiment, actual record counts embedded in trailer record type are compared against actual record count read by utility 155.

Certain embodiments of the present disclosure may include some, all, or none of these advantages. Other advantages may be apparent to those of ordinary skill in the art.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A system, comprising:
an interface and one or more processors, the interface configured to:
receive, from an upstream progression point configured to receive, process, and transmit data, a dataset comprising a plurality of variable length input records, each input record comprising a plurality of fields;
for each input record, the one or more processors configured to:
compare the input record to a plurality of predetermined record types to determine whether the input record matches one or more of the predetermined record types;
upon a determination that the input record matches one or more of the predetermined record types, determine one or more rules applicable to the input record, the one or more rules determined based on the predetermined record types that match the input record; and
determine whether the input record comprises a data quality error by applying the one or more rules applicable to the input record, wherein the one or more rules determine whether the input record comprises the data quality error based on one or both of a structure of one or more of the fields of the input record and a value of one or more of the fields of the input record; and
the one or more processors further configured to:
determine a data quality of the dataset associated with whether the input records comprise greater than a threshold number of data quality errors, the data quality determined based at least in part on the result of determining, for each input record, whether the input record comprises the data quality error;
determine that the data quality of the received dataset is below a predetermined data quality;
in response to determining that the data quality is below the predetermined data quality, communicate, to a data hub, the determined data quality and a return code indicating that the data quality is below the predetermined data quality;
following communicating the data quality and the return code to the data hub, receive, from the data hub, a request to reprocess the dataset before the dataset is provided to a downstream progression point, the request based on a comparison of the communicated data quality and a data quality determined at the upstream progression point;

determine a file size associate with the received dataset;

determine, based on the determined file size, an updated rule indicating that a subsequently received dataset should have a larger file size than the determined file size; and store the updated rule.

2. The system of claim 1, wherein the one or more rules that determine the quality of the input record based on a structure of one or more of the fields of the input record comprise at least one of:

a rule that determines whether one or more of the plurality of fields is in a particular format; and a rule that determines whether the dataset comprises a number of input records that falls within a predetermined numerical range.

3. The system of claim 1, wherein the one or more rules that determine the quality of the input record based on a value of one or more of the fields of the input record comprise at least one of:

a rule that determines whether the value of one or more of the plurality of fields is within a certain numerical range; and a rule that determines whether one or more of the plurality of fields comprises a null value.

4. The system of claim 1, wherein the one or more rules comprise a subset of rules selected from a group of rules available to a data quality utility, the subset of rules determined from a control file configured to include or exclude rules based on constraints of the system.

5. The system of claim 1, wherein at least one of the rules determines whether the structure or the value of one or more of the fields of the input record falls within a predetermined tolerance, the predetermined tolerance determined based on applying the at least one rule to at least one previous dataset before applying the at least one rule to the current dataset.

6. The system of claim 1, wherein the system is further configured to communicate the dataset and information indicating the data quality of the dataset to a data hub.

7. A non-transitory computer readable medium comprising logic that, when executed by an image routing processor, is operable to:

receive, from an upstream progression point configured to receive, process, and transmit data, a dataset comprising a plurality of variable length input records, each input record comprising a plurality of fields;

for each input record, compare the input record to a plurality of predetermined record types to determine whether the input record matches one or more of the predetermined record types;

for each input record, upon a determination that the input record matches one or more of the predetermined record types, determine one or more rules applicable to the input record, the one or more rules determined based on the predetermined record types that match the input record;

for each input record, determine whether the input record comprises a data quality error by applying the one or more rules applicable to the input record, wherein the one or more rules determine whether the input record comprises the data quality error based on one or both of a structure of one or more of the fields of the input record and a value of one or more of the fields of the input record; and determine a data quality of the dataset associated with whether the input records comprise greater than a threshold number of data quality errors, the data quality determined based at least in part on the result of determining, for each input record, whether the input record comprises the data quality error;

determine that the data quality of the received dataset is below a predetermined data quality;

in response to determining that the data quality is below the predetermined data quality, communicate, to a data hub, the determined data quality and a return code indicating that the data quality is below the predetermined data quality;

following communicating the data quality and the return code to the data hub, receive, from the data hub, a request to reprocess the dataset before the dataset is provided to a downstream progression point, the request based on a comparison of the communicated data quality and a data quality determined at the upstream progression point;

determine a file size associated with the received dataset;

determine, based on the determined file size, an updated rule indicating that a subsequently received dataset should have a larger file size than the determined file size; and store the updated rule.

8. The computer readable medium of claim 7, wherein the one or more rules that determine the quality of the input record based on a structure of one or more of the fields of the input record comprise at least one of:

a rule that determines whether one or more of the plurality of fields is in a particular format; and a rule that determines whether the dataset comprises a number of input records that falls within a predetermined numerical range.

9. The computer readable medium of claim 7, wherein the one or more rules that determine the quality of the input record based on a value of one or more of the fields of the input record comprise at least one of:

a rule that determines whether the value of one or more of the plurality of fields is within a certain numerical range; and a rule that determines whether one or more of the plurality of fields comprises a null value.

10. The computer readable medium of claim 7, wherein the one or more rules comprise a subset of rules selected from a group of rules available to a data quality utility, the subset of rules determined from a control file configured to include or exclude rules based on constraints of the system.

11. The computer readable medium of claim 7, wherein at least one of the rules determines whether the structure or the value of one or more of the fields of the input record falls within a predetermined tolerance, the predetermined tolerance determined based on applying the at least one rule to at least one previous dataset before applying the at least one rule to the current dataset.

12. The computer readable medium of claim 7 further configured to communicate the dataset and information indicating the data quality of the dataset to a data hub.

13. A method comprising:

receiving, from an upstream progression point configured to receive, process, and transmit data, a dataset comprising a plurality of variable length input records, each input record comprising a plurality of fields;

for each input record, comparing the input record to a plurality of predetermined record types to determine whether the input record matches one or more of the predetermined record types;

for each input record, upon a determination that the input record matches one or more of the predetermined record types, determining one or more rules applicable to the input record, the one or more rules determined based on the predetermined record types that match the input record;

for each input record, determining whether the input record comprises a data quality error by applying the one or more rules applicable to the input record, wherein the one or more rules determine whether the input record comprises the data quality error based on one or both of a structure of one or more of the fields of the input record and a value of one or more of the fields of the input record; and determining a data quality of the dataset associated with whether the input records comprise greater than a threshold number of data quality errors, the data quality determined based at least in part on the result of determining, for each input record, whether the input record comprises the data quality error;

determining that the data quality of the received dataset is below a predetermined data quality;

in response to determining that the data quality is below the predetermined data quality, communicating, to a data hub, the determined data quality and a return code indicating that the data quality is below the predetermined data quality;

following communicating the data quality and the return code to the data hub, receiving, from the data hub, a request to reprocess the dataset before the dataset is provided to a downstream progression point, the request based on a comparison of the communicated data quality and a data quality determined at the upstream progression point;

determining a file size associated with the received dataset;

determining, based on the determined file size, an updated rule indicating that a subsequently received dataset should have a larger file size than the determined file size; and storing the updated rule.

14. The method of claim 13, wherein the one or more rules that determine the quality of the input record based on a structure of one or more of the fields of the input record comprise at least one of:

a rule that determines whether one or more of the plurality of fields is in a particular format; and a rule that determines whether the dataset comprises a number of input records that falls within a predetermined numerical range.

15. The method of claim 13, wherein the one or more rules that determine the quality of the input record based on a value of one or more of the fields of the input record comprise at least one of:

a rule that determines whether the value of one or more of the plurality of fields is within a certain numerical range; and a rule that determines whether one or more of the plurality of fields comprises a null value.

16. The method of claim 13, wherein the one or more rules comprise a subset of rules selected from a group of rules available to a data quality utility, the subset of rules determined from a control file configured to include or exclude rules based on constraints of the system.

17. The method of claim 13, wherein at least one of the rules determines whether the structure or the value of one or more of the fields of the input record falls within a predetermined tolerance, the predetermined tolerance determined based on applying the at least one rule to at least one previous dataset before applying the at least one rule to the current dataset.

* * * * *